(12) United States Patent
Sinha et al.

(10) Patent No.: US 9,336,319 B2
(45) Date of Patent: May 10, 2016

(54) DATA FILE AND RULE DRIVEN SYNCHRONOUS OR ASYNCHRONOUS DOCUMENT GENERATION

(75) Inventors: Suchisubhra Sinha, San Jose, CA (US); Ravi Ketankumar Mistry, Los Gatos, CA (US); Richard H. Heisterberg, Mountain View, CA (US); Gurudatta Horantur Shivaswamy, Sunnyvale, CA (US); Rangaraj Keshavamurthy Belur, San Jose, CA (US)

(73) Assignee: eBay Inc., San Jose, CA (US)

( * ) Notice: Subject to any disclaimer, the term of this patent is extended or adjusted under 35 U.S.C. 154(b) by 1198 days.

(21) Appl. No.: 12/558,204

(22) Filed: Sep. 11, 2009

(65) Prior Publication Data

US 2011/0066935 A1    Mar. 17, 2011

(51) Int. Cl.
*G06F 17/00* (2006.01)
*G06F 17/30* (2006.01)
*G06F 17/22* (2006.01)

(52) U.S. Cl.
CPC ........ *G06F 17/3089* (2013.01); *G06F 17/2229* (2013.01); *G06F 17/2264* (2013.01)

(58) Field of Classification Search
CPC ............ G06F 17/2211; G06F 17/2288; G06F 17/3089
USPC .................. 715/200, 234, 237, 240, 273, 277
See application file for complete search history.

(56) References Cited

U.S. PATENT DOCUMENTS

| 6,738,804 | B1 * | 5/2004 | Lo .................................. 709/219 |
| 7,640,512 | B1 * | 12/2009 | Appling ........................ 715/771 |
| 8,312,077 | B2 * | 11/2012 | Gale et al. ..................... 709/203 |
| 2008/0051642 | A1 * | 2/2008 | Krupnik ............ A61B 1/00009 600/302 |
| 2008/0120368 | A1 * | 5/2008 | Gale et al. ..................... 709/203 |
| 2008/0199144 | A1 * | 8/2008 | Hailey et al. ..................... 386/46 |
| 2008/0244037 | A1 * | 10/2008 | Okuda ........................... 709/217 |
| 2009/0024697 | A1 | 1/2009 | Melet et al. |
| 2009/0106769 | A1 * | 4/2009 | Nakamura ..................... 719/311 |
| 2009/0150262 | A1 * | 6/2009 | Mizhen ........................... 705/27 |
| 2010/0100585 | A1 * | 4/2010 | Guney et al. .................. 709/203 |

* cited by examiner

*Primary Examiner* — Stephen Hong
*Assistant Examiner* — Gregory J Vaughn
(74) *Attorney, Agent, or Firm* — Schwegman Lundberg & Woessner, P.A.

(57) ABSTRACT

A data file describes a document to be generated and stores an instruction to provide constituent data of the document via a network. The data file is accessed at a local computer, and the document is generated based on the data file. The generated document is communicated via the network to a remote computer. At the local computer, the instruction to provide constituent data is processed using a processor of the local computer. The constituent data is provided via the network to the remote computer as an update of the generated document.

21 Claims, 5 Drawing Sheets

DATA FILE AND RULE DRIVEN SYNCHRONOUS OR ASYNCHRONOUS DOCUMENT GENERATION

TECHNICAL FIELD

The subject matter disclosed herein generally relates to information management. Specifically, the present disclosure addresses methods and systems of using a data file to generate a document or update a generated document.

BACKGROUND

In the 21st century, information is frequently stored in a document, which may take the form of an electronic document. The Internet and the World Wide Web enable users, via machines, to receive and view documents. In many cases, a server computer may send a document to a client computer, for example, at the request of a user of the client computer. For example, the server computer may be a web server, and the document may be a webpage. The client computer receives and displays the document for viewing by the user, which may be a human user or another machine.

A document may be generated by a machine. Specialized software may configure a general-purpose computer into a special-purpose computer usable to generate the document. In various implementations, such a machine may generate a document specifically customized for a particular user. For example, a server machine may generate a personalized webpage for an individual user, based on various preferences of the user. The user's preferences may be stored in a user profile that is available to the server machine for use in the generation of a personalized webpage. This often provides a more relevant, personal, or meaningful presentation of information to the user.

BRIEF DESCRIPTION OF THE DRAWINGS

Some embodiments are illustrated by way of example and not limitation in the figures of the accompanying drawings in which.

DETAILED DESCRIPTION

Example methods and systems are directed to using a data file to generate a document or update a generated document. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A data file describes a document to be generated and stores an instruction to provide constituent data of the document via a network. The data file is accessed at a local computer, and the document is generated based on the data file. The generated document is communicated via the network to a remote computer. At the local computer, the instruction to provide constituent data is processed using a processor of the local computer. The constituent data is provided via the network to the remote computer as an update of the generated document.

In some example embodiments, a data file describes a webpage as including multiple portions that are independently refreshable. In other words, the portions of the webpage are refreshable independent of one another. The data file also stores an instruction to provide a refreshed portion of the webpage via a network. At a server computer, the data file is accessed, and the instruction is processed using a processor of the server computer. A portion of the webpage is generated and provided via the network to a client computer as the refreshed portion of the webpage.

As used herein, "constituent data" refers to data that can be incorporated into a document. For example, constituent data may be a refreshed portion of a webpage that can be incorporated into the webpage. As another example, constituent data may be an updated section of the document recently edited by a remote user. As yet another example, constituent data may be a real-time data feed, such as a stock price ticker. Additional examples of constituent data include, but are not limited to, text data, audio data, image data, and video data. According to various example embodiments, constituent data may be representative of a news feed, weather information, a blog entry, an advertisement, a product recommendation, or contents of an online shopping cart.

Figure 1:
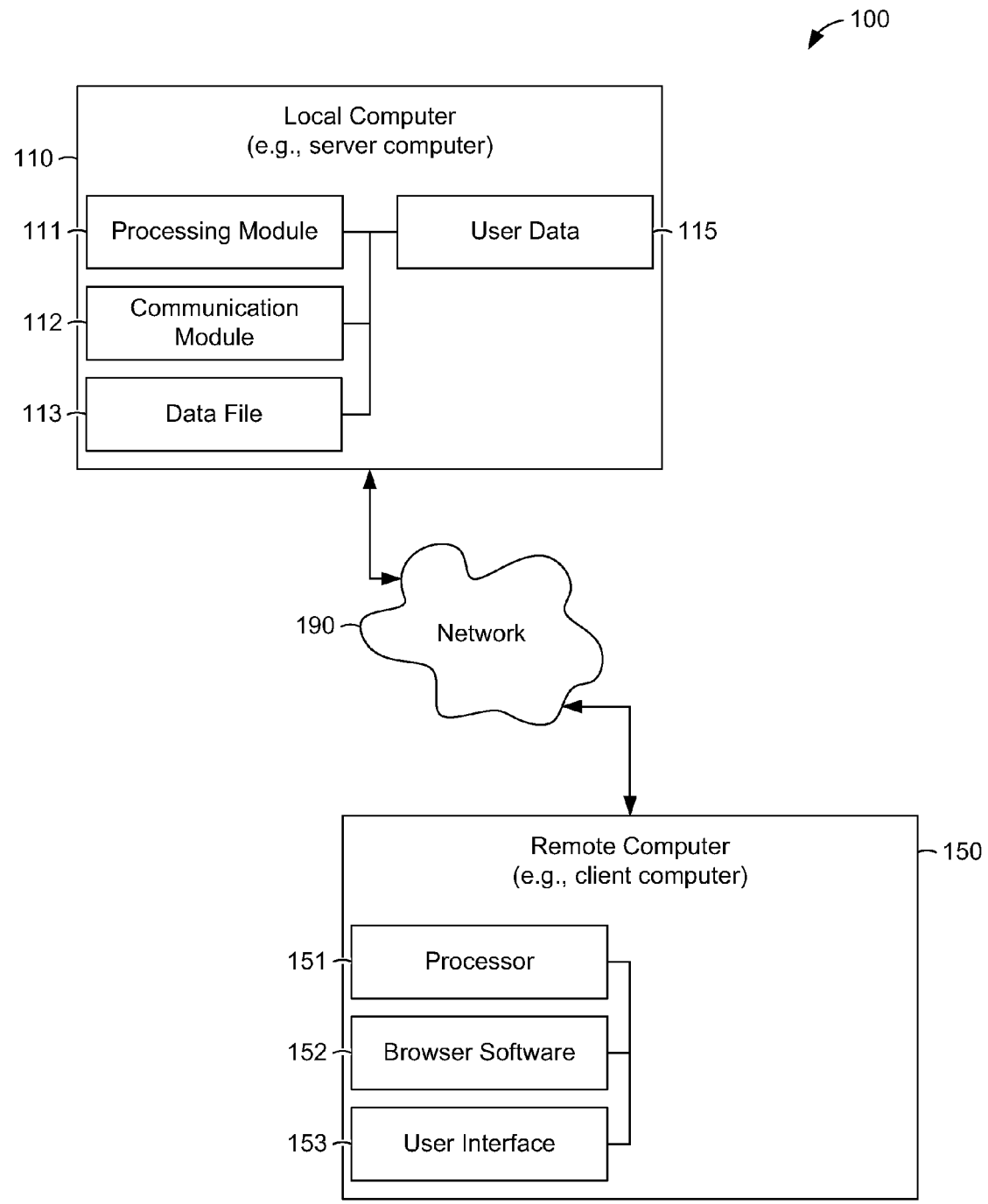
FIG. 1 is a block diagram illustrating components of a system to use a data file to update a generated document, according to some example embodiments.

FIG. 1 is a block diagram illustrating components of a system 100 to use a data file to update a generated document, according to some example embodiments. The system 100 includes a local computer 110 and a remote computer 150 connected together via a network 190. The local computer 110 may be a server computer (e.g., a web server) or a collection of multiple server computers (e.g., a server farm). The remote computer 150 may be a client computer (e.g., a web client) or one or more computers functioning as a client computer (e.g., a web proxy) with respect to the local computer 110.

The network 190 may be any kind of network that communicatively couples multiple computers (e.g., local computer 110 and remote computer 150). For example, the network may be a local area network (LAN), a wide area network (WAN), the Internet, or any combination thereof. The network 190 may include wired infrastructure, wireless infrastructure, or any combination thereof.

The local computer 110 includes a processing module 111, a communication module 112, a data file 113, and user data 115. The processing module 111, the communication module 112, or any combination thereof may be implemented as hardware modules, as described below with respect to FIG. 5. The data file 113, the user data 115, or any combination thereof may be implemented as data structures stored in a memory or a machine-readable medium, as described below with respect to FIG. 5. The local computer 110 may be configured to implement a method described below with respect to FIG. 4.

The remote computer 150 includes a processor 151, browser software 152 (e.g., stored in a memory of the remote computer 150), and a user interface 153 to enable a user to interact with the remote computer 150.

The data file 113 describes a document (e.g., a webpage or a document to be generated) and stores an instruction to provide constituent data (e.g., a refreshed portion of a webpage) via the network 190. The data file is described in greater detail below with respect to FIG. 2.

The user data 115 stores information that corresponds to a user (e.g., a user of the remote computer 150). This information represents one or more characteristics of the user. The user data 115 is described in greater detail below with respect to FIG. 3.

The communication module 112 is configured to access the data file 113, to communicate a generated document via the network 190 to the remote computer 150, and to provide constituent data via the network 190 to the remote computer 150 as an update of the generated document. For example, the communication module 112 may be configured to generate a webpage, and the constituent data may be an update to the generated webpage.

The communication module 112 may be configured to provide the constituent data synchronously, asynchronously, or any combination thereof. The constituent data may be provided in response to a request for an update of the generated document, as in, for example, a dynamically changing webpage that alters its content based on input provided by a user. For example, the content of the webpage may be updated based on personalization, localization, or interaction data received from the user, or any combination thereof. Alternatively, the constituent data may be provided irrespective of any input provided by the user, as in, for example, a stock ticker, an automatically changing advertisement, or a news feed. In some hybrid situations, the constituent data may be provided as a continuous stream of data that is dynamically modified in response to user input, as in, for example, a continuously updated stock ticker that provides user-selectable levels of detail.

The processing module 111 is configured to generate the document based on the data file 113 and to process the instruction to provide constituent data via the network 190. For example, the processing module 111 may be configured to generate a webpage. In processing the instruction to provide constituent data, the processing module 111 may generate the constituent data, access constituent data stored elsewhere via the network 190, or any combination thereof.

In some example embodiments, the data file 113 includes one or more rules corresponding to the instruction to provide constituent data, and the processing module 111 is configured to process the instruction in accordance with the rule corresponding to the instruction. For example, a rule may limit the processing of its corresponding instruction to certain hours of the day. According to some example embodiments, the data file 113 stores multiple instructions to provide various constituent data via the network 190. Where multiple instructions are stored in the data file 113, each of the multiple instructions may correspond to one or more rules stored in the data file 113.

In certain example embodiments, the data file 113 includes a rule based on a characteristic of the network 190, a characteristic of the remote computer 150, of the local computer 110, of browser software executing on the remote computer 150, or of a user of the remote computer 150. For example, a rule may enable or disable the processing of its corresponding instruction based on the performance of the network 190 (e.g., allow processing of the instruction only for high-speed broadband networks). As another example, a rule may set conditions on the processing of its corresponding instruction based on the displayed screen size of the remote computer 150 (e.g., disallow processing of the instruction for graphical displays below 1024×768 pixels). As yet another example, a rule may control the processing of its corresponding instruction based on processor load of the local computer 110 (e.g., allow processing of the instruction only during periods of low processor activity). As a further example, a rule may govern the processing of its corresponding instruction based on the user data 115 (e.g., prevent processing of the instruction if the user is likely to object to viewing the corresponding constituent data).

In various example embodiments, a rule may reference another rule. For example, a first rule may set forth conditions for the processing of an entire set of rules (e.g., executing a second rule, a third rule, and a fourth rule). As another example, the first rule may set conditions for processing its corresponding instruction, as well as processing another rule (e.g., if the conditions are met, process the instruction and process the second rule, the third rule, and the fourth rule). This has the effect of enabling sophisticated behavior with respect to provision of various constituent data to the remote computer 150.

In some example embodiments, the communication module 112 is configured to receive a request to update the generated document. For example, the communication module 112 may receive such a request via the network 190 and originating from the remote computer 150 (e.g., a request submitted by a user of the remote computer 150). According to some example embodiments, the processing module 111 is configured to process the instruction responsive to the request.

In certain example embodiments, the processing module 111 is configured to regenerate the generated document based on the data file 113. The regenerated document includes the constituent data to be provided according to the instruction stored in the data file 113. For example, where the generated document is a webpage generated at one point in time, the regenerated document may be an updated version of the same webpage generated at a later point in time. According to some example embodiments, the communication module 112, in providing the constituent data to the remote computer 150, is configured to communicate the regenerated document via the network 190 to the remote computer 150.

Figure 2:
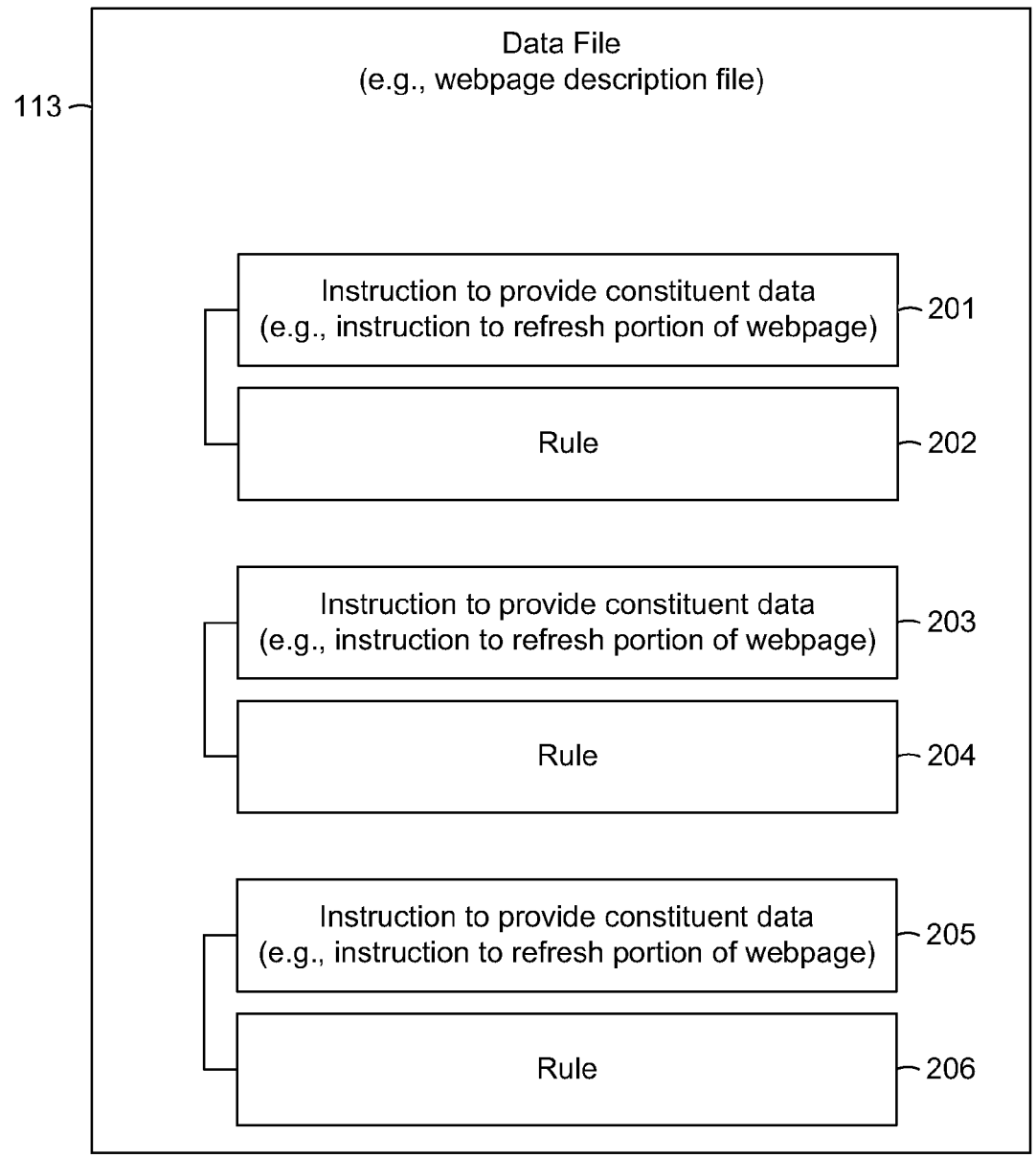
FIG. 2 is a block diagram illustrating a data file to update a generated document, according to some example embodiments.

FIG. 2 is a block diagram illustrating the data file 113, according to some example embodiments. The data file 113 is a data structure describing a document (e.g., a webpage or a document to be generated). For example, the data file 113 may be a webpage description file that describes a webpage. The webpage description file may be encoded using eXtensible Markup Language (XML). According to some example embodiments, the data file 113 describes a webpage as including one or more portions of the webpage that are independently refreshable (e.g., each of the portions refreshable independently of each other). As an example, the data file 113 may describe a webpage to be generated, where the webpage includes one or more portions, such as widgets, frames, subpages, advertisements, or any combination thereof. Examples of a webpage portion include, but are not limited to, a stock ticker, a stock portfolio overview, an advertisement, a news feed, a summary of news headlines, an online shopping cart, a map, a restaurant review, an email interface, a blog or micro-blog interface, a calendar application, and a game.

The data file 113 stores an instruction 201 to provide constituent data via the network 190. According to some example embodiments, the instruction 201 is to provide a refreshed portion of the webpage via the network 190 (e.g., to refresh the portion of the webpage). For example, the instruction 201 may be to send via the network 190 an update of a widget constituting a generated webpage.

In some example embodiments, the data file 113 includes a rule 202 corresponding to the instruction 201. For example, as noted above, the rule 202 may limit the processing of its corresponding instruction 201 to certain hours of the day. The rule 202 may be based on one or more characteristics of the network 190, of the remote computer 150, of the local computer 110, of the browser software 152 at the remote computer 150, of a user, or any combination thereof. This has the effect of enabling sophisticated behavior with respect to provision of various constituent data and improving responsiveness or usability for the user with respect to obtaining an update of the document, because only the most appropriate, most relevant, or most meaningful constituent data is provided.

The rule 202 may be based on a characteristic of the network 190. For example, the rule 202 may disallow processing of the instruction 201 if the network 190 is too slow to communicate the constituent data within a specified time interval. As another example, the rule 202 may allow processing of the instruction 201 only if the network 190 has a bit rate above a specified threshold value.

The rule 202 may be based on a characteristic of the remote computer 150 (e.g., a client computer). For example, the rule 202 may allow processing of the instruction 201 only if the remote computer 150 has a graphical display of a specified size or larger. As another example, the rule 202 may disallow processing of the instruction 201 if the remote computer 150 is a portable electronic device (e.g., a cellphone or a smart phone).

The rule 202 may be based on a characteristic of the local computer 110 (e.g., a server computer). For example, the rule 202 may allow processing of the instruction 201 only during periods of low processor activity at the local computer 110.

The rule 202 may be based on a characteristic of the browser software 152 at the remote computer 150. For example, the rule 202 may disallow processing of the instruction 201 if the browser software 152 uses a display window smaller than a specified size.

The rule 202 may be based on user data corresponding to a user of the remote computer 150 (e.g., user data 115). For example, the rule 202 may be based on user preferences (e.g., preferences explicitly set by the user), a user profile (e.g., characteristics inferred from the user's behavior), a user's purchase history, a user's browsing history, a user's unsuccessful purchase attempts (e.g., failed auction bids), or any combination thereof. User data is further discussed below with respect to FIG. 3.

In certain example embodiments, the data file 113 includes multiple instructions (e.g., instructions 201, 203, and 205). Each instruction may correspond to one or more rules (e.g., rules 202, 204, and 206) or to no rule that all. For simplicity, three instructions are shown in FIG. 2, each with a single corresponding rule.

As noted above, the rule 202 may reference another rules (e.g., rules 204 and 206). According to various example embodiments, the processing of the rule 202 includes initiating processing of one or more referenced rules (e.g., rules 204 and 206). As an example, if the first rule 202 references a second rule 204, and if both rules are evaluated as satisfied (e.g., true), then both of their respective instructions 201 and 203 are to be processed, resulting in provision of both of their respective bodies of constituent data.

Figure 3:
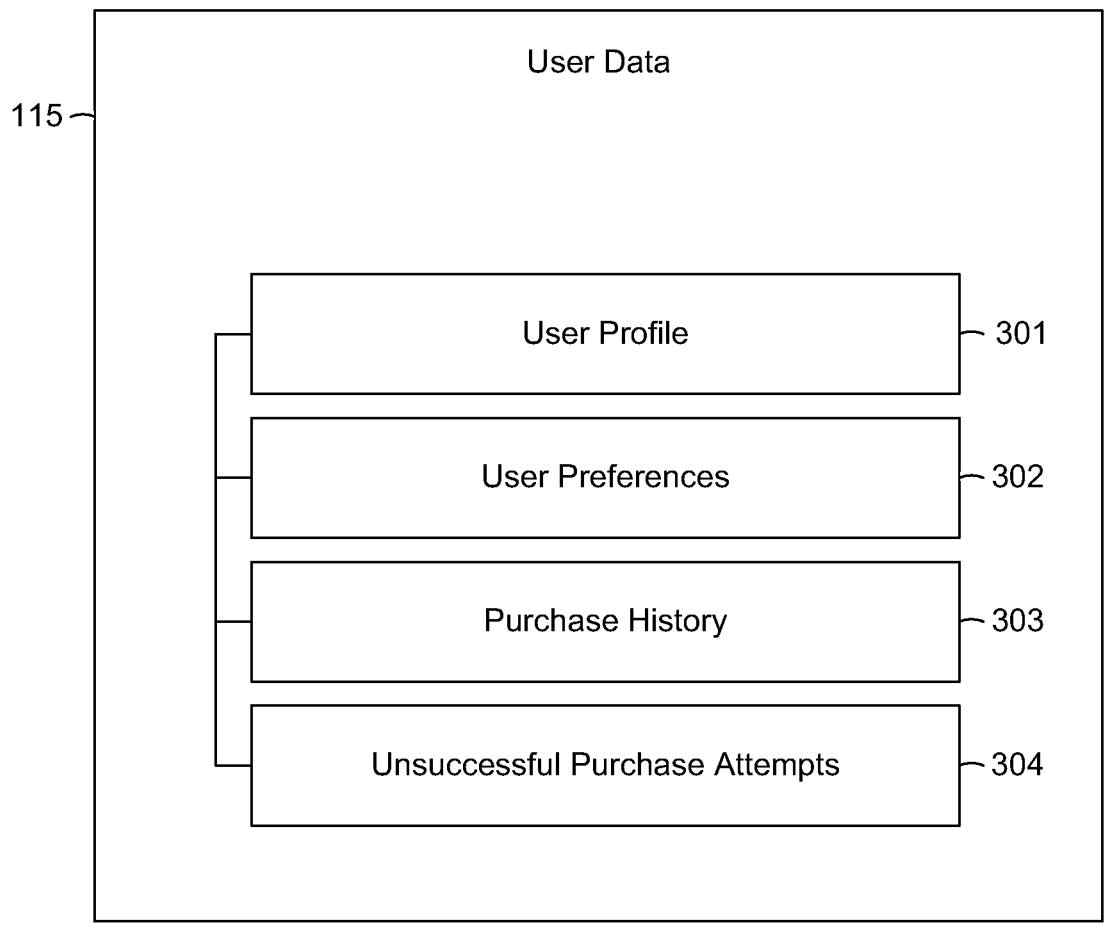
FIG. 3 is a block diagram illustrating a data structure to store user data, according to some example embodiments.

FIG. 3 is a block diagram illustrating the user data 115, according to some example embodiments. The user data 115 is a data structure to store data corresponding to a user (e.g., a user of the remote computer 150). For example, this data may include a user profile 301, user preferences 302, a purchase history 303, unsuccessful purchase attempts 304 (e.g., failed auction bids), or any combination thereof. The user profile 301 may include characteristics of the user inferred by a machine from the user code's behavior. The user preferences 302 may include preferences explicitly set by the user. The purchase history 303 may include records of, or references to, purchase transactions associated with the user. The unsuccessful purchase attempts 304 may include records of, or references to, user-submitted auction bids that did not result in a purchase of an item.

According to various example embodiments, the user data 115 may include a browsing history (e.g., a list of websites previously accessed by the user), web cookies, social networking data (e.g., a list of identifiers of the user's friends or associates), cloud computing data (e.g., information pertaining to files accessible by the user in a cloud computing environment), or any combination thereof.

Figure 4:
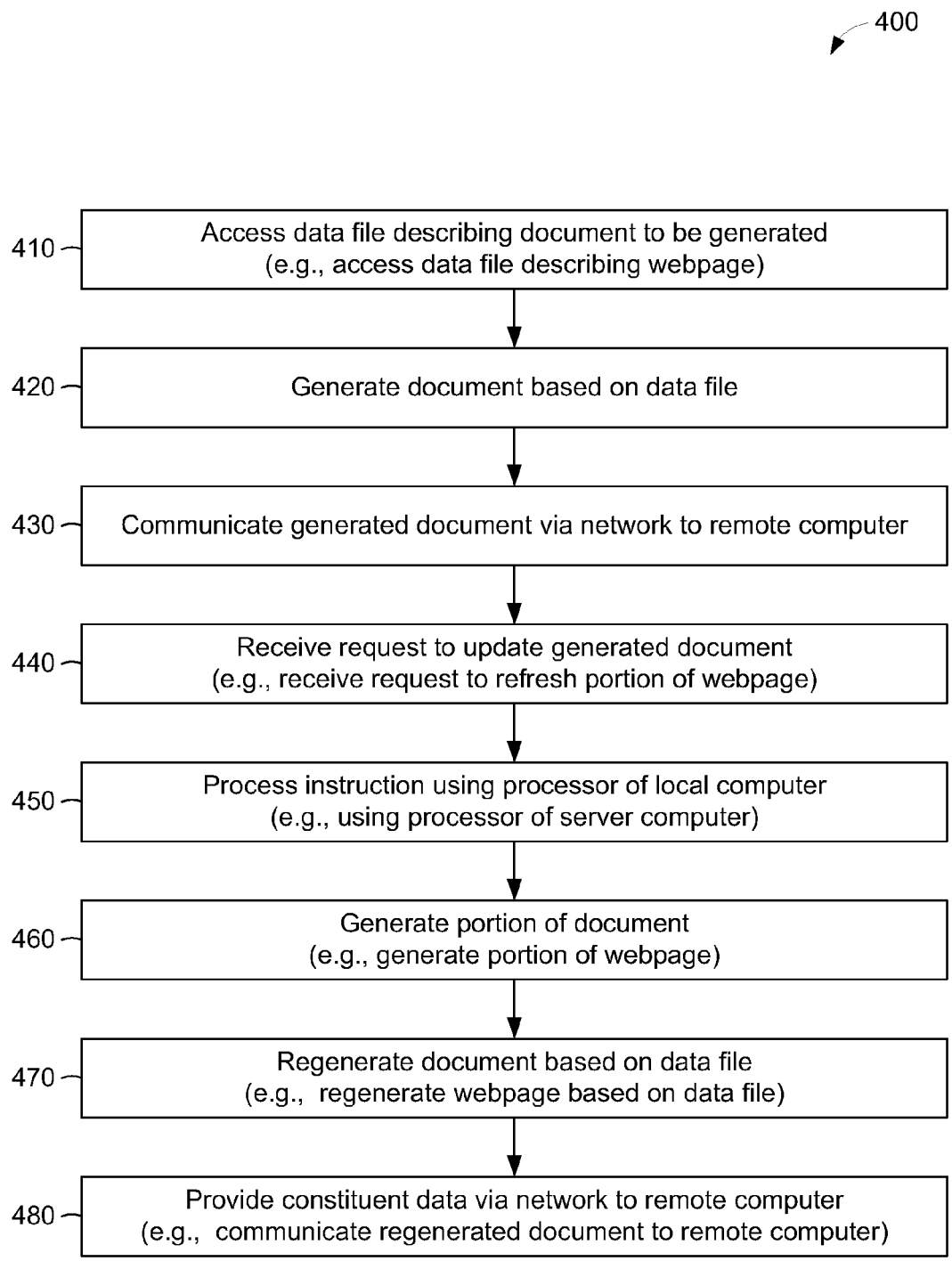
FIG. 4 is a flow chart illustrating operations in a method of using a data file to update a generated document, according to some example embodiments.

FIG. 4 is a flow chart illustrating operations in a method 400 of using a data file to update a generated document, according to some example embodiments. The method 400 may be implemented by a machine (e.g., a computer), such as for example, the local computer 110, a server computer, or a machine able to read a machine-readable medium. The method 400 includes operations 410, 420, 430, 440, 450, 460, 470, and 480.

Operation 410 involves accessing the data file 113. For example, the communication module 112 may access the data file 113 at the local computer 110. As noted above, the data file 113 describes a document (e.g., a webpage or a document to be generated). The data file 113 also stores an instruction (e.g., instruction 201) to provide constituent data (e.g., to provide a refreshed portion of a webpage, via the network 190). The data file 113 may be accessed at a local computer 110, which may be a server computer, although the data file 113 may be stored on any computer or storage device accessible via the network 190, including the local computer 110.

Operation 420 involves generating the document based on the data file 113. For example, operation 420 may involve generating a webpage based on the data file 113. Operation 420 may be performed by the processing module 111.

Operation 430 involves communicating the generated document via the network 190 to the remote computer 150, which may be a client computer. For example, operation 430 may involve communicating a generated webpage to the remote computer 150. Operation 430 may be performed by the communication module 112.

Operation 440 involves receiving a request to update the generated document. For example, operation 440 may involve receiving a request to refresh a portion of a generated webpage. The request may be received from the remote computer 150 via the network 190. For example, a user of the remote computer 150 may originate the request using the user interface 153 of the remote computer 150, and the remote computer 150 may communicate the request via the network 190 for reception by the local computer 110. As another example, the user may originate the request using the browser software 152 or the user interface 153 of the remote computer 150 (e.g., by resizing a browser window, or clicking on a button or tab displayed in the browser window). Operation 440 may be performed by the communication module 112.

Operation 450 involves processing the instruction (e.g., instruction 202). For example, the processing module 111 may process the instruction. The processing of the instruction may be performed using a processor of the local computer 110 (e.g., a server computer). According to various example embodiments, the processing of the instruction may be responsive to the request received in operation 440.

Operation 460 involves generating a portion of the document. The portion of the document is less than an entirety of the document. For example, operation 460 may involve generating a portion of a generated webpage, where the portion is less than the entire webpage. This operation has the effect of generating constituent data to be provided according to the instruction (e.g., instruction 201). Operation 460 may be performed by the processing module 111.

Operation 470 involves regenerating the generated document based on the data file 113. The regenerated document includes the constituent data to be provided according to the instruction (e.g., instruction 201). For example, operation 470 may involve regenerating a webpage so that the regenerated webpage includes a refreshed portion of the webpage. This operation has the effect of encapsulating the constituent data within the document. Operation 470 may be performed by the processing module 111.

Operation 480 involves providing the constituent data via the network 190 to the remote computer 150 as an update of the generated document. For example, operation 480 may involve providing the generated portion of a generated webpage as a refreshed portion of the webpage. According to various example embodiments, more than one generated portions of a webpage may be provided. In aggregate, these portions may be less than the entirety of the webpage, or they may constitute the entirety of the webpage. Operation 480 may be performed by the communication module 112.

In some example embodiments, the data file 113 includes a rule (e.g., rule 202) corresponding to the instruction (e.g., instruction 201). According to certain example embodiments, operation 450 may involve processing the instruction in accordance with the rule. As noted above, in various example embodiments, more than one rule may correspond to the instruction. Furthermore, as noted above, the data file 113 may include more than one instruction. For example, the data file 113 may include multiple instructions to provide multiple bodies of constituent data (e.g., each instruction is to respectively provide specific constituent data corresponding to that instruction).

Certain example embodiments may provide one or more potential advantages. These potential advantages include, but are not limited to, reducing network traffic involved in communication of entire documents or entire webpages, reducing computational loads on processing hardware involved in refreshing or re-rendering entire documents or entire webpages, and improving the responsiveness or usability of interactive documents or webpages as perceived by a user. Technical problems addressed by these potential advantages include, but are not limited to, delays due to network congestion, delays due to processor loading, and poor usability or responsiveness of interactive documents or webpages as perceived by a user.

Figure 5:
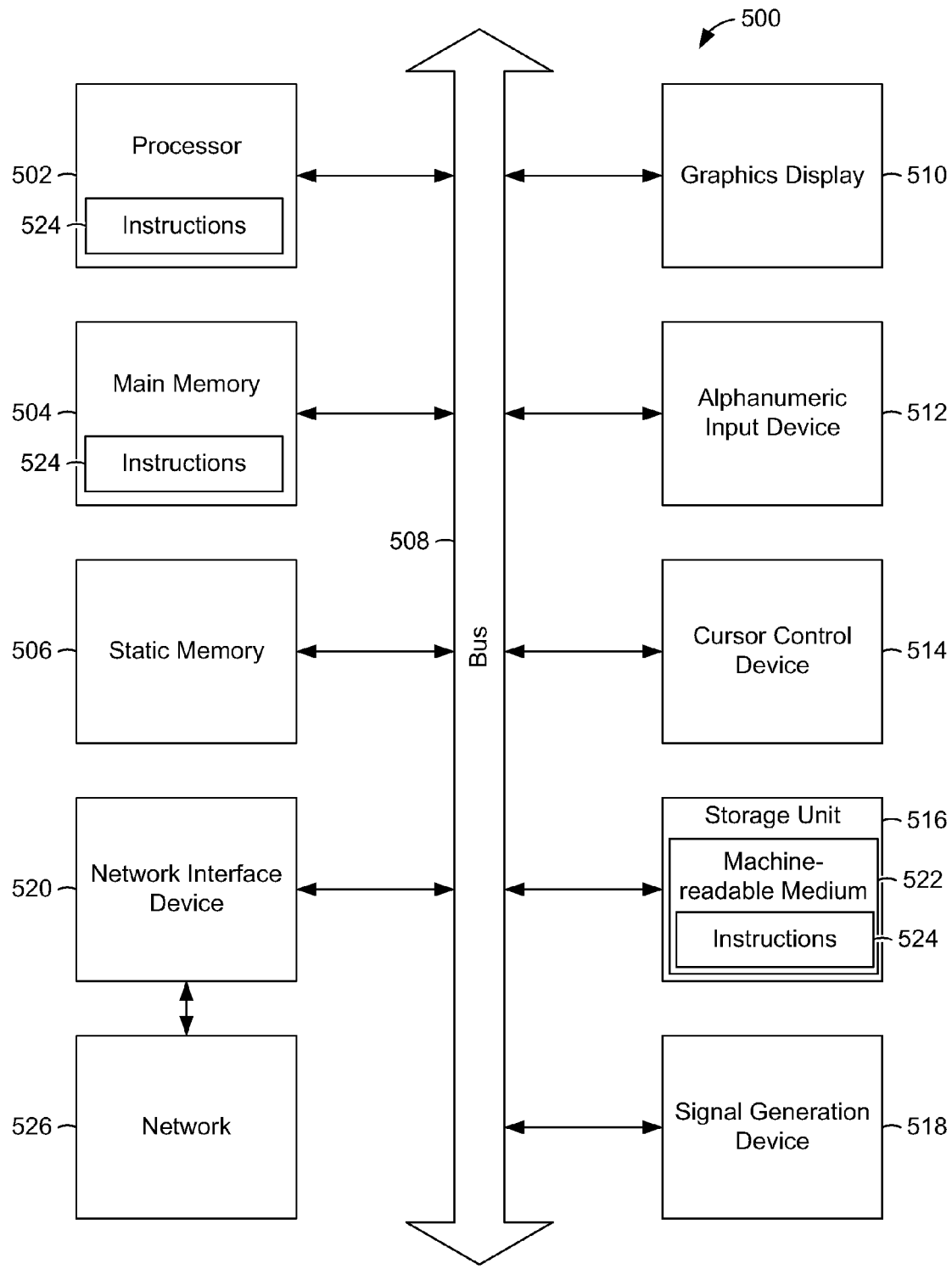
FIG. 5 is a block diagram illustrating components of an example machine able to read instructions from a machine-readable medium and use a data file to update a generated document.

FIG. 5 illustrates components of an example machine able to read instructions from a machine-readable medium and use a data file (e.g., data file 113) to update a generated document. Specifically, FIG. 5 shows a diagrammatic representation of a machine in the example form of a computer system 500 within which instructions 524 (e.g., software) for causing the machine to perform any one or more of the methodologies discussed herein may be executed. For example, the machine may include one or more hardware modules configured to perform one or more operations of a method described herein. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include a collection of machines that individually or jointly execute instructions 524 to perform any one or more of the methodologies discussed herein.

The computer system 500 includes a processor 502 (e.g., a central processing unit (CPU), a graphics processing unit (GPU), a digital signal processor (DSP), application specific integrated circuits (ASICs), radio-frequency integrated circuits (RFICs), or any combination of these), a main memory 504, and a static memory 506, which communicate with each other via a bus 508. The computer system 500 may further include a graphics display unit 510 (e.g., a plasma display panel (PDP), a liquid crystal display (LCD), a projector, or a cathode ray tube (CRT)). The computer system 500 may also include an alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within the processor's cache memory) during execution thereof by the computer system 500, the main memory 504 and the processor 502 also constituting machine-readable media. The instructions 524 (e.g., software) may be transmitted or received over a network 526 via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies described herein. The term "machine-readable medium" shall accordingly be taken to include, but not be limited to, data repositories in the form of solid-state memories, optical media, and magnetic media.

Throughout this specification, plural instances may implement components, operations, or structures described herein as a single instance. Although individual operations of one or more methods are illustrated and described as separate operations, one or more of the individual operations may be performed concurrently, and nothing requires that the operations be performed in the order illustrated. Structures and functionality presented herein as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone system, a client computer system, or a server computer system) or one or more hardware modules of a computer system (e.g., a processor or a group of processors) may be configured by software (e.g., an application or an application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, a "hardware-implemented module" is a hardware module. Considering embodiments in which one or more hardware modules are temporarily configured (e.g., programmed), each of the hardware modules need not be configured or instantiated at any one instance in time. For example, where a particular hardware module includes a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., via a circuit or bus connecting the hardware modules) between or among the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

One or more processors, hardware modules, or processor-implemented modules may also operate to support performance of the relevant operations in a "cloud computing" environment or in a "software as a service" (SaaS) environment. For example, at least some of the operations may be performed by a group of computers (as examples of machines including processors), these operations being accessible via a network (e.g., the Internet) and via one or more interfaces (e.g., application program interfaces (APIs).)

The performance of certain of the operations may be distributed among the one or more processors, not only residing within a single machine, but deployed across a number of machines. In some example embodiments, the one or more processors, hardware modules, or processor-implemented modules may be located in a single geographic location (e.g., within a home environment, an office environment, or a server farm). In other example embodiments, the one or more processors, hardware modules, or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive or, unless specifically stated otherwise.

What is claimed is:

1. A method of providing a refreshed portion of a generated webpage, the method comprising:
   from a server computer, communicating the generated webpage via a network;
   at the server computer, accessing a data file that describes the generated webpage as including a plurality of portions, each portion of the plurality of portions being independently refreshable, the data file storing an instruction to provide the refreshed portion of the generated webpage via the network and including a rule corresponding to the instruction;
   at the server computer, processing the instruction stored in the accessed data file to provide the refreshed portion using a processor of the server computer, wherein the processing of the instruction is in accordance with the rule and wherein the rule is satisfied prior to processing of the instruction;
   at the server computer, updating a first portion of the generated webpage, the first portion being less than an entirety of the generated webpage; and
   from the server computer, providing the updated first portion of the generated webpage as the refreshed portion of the generated webpage via the network to a client computer, in accordance with the instruction stored in the accessed data file and processed by the server computer.

2. The method of claim 1, wherein
   the rule is based on a characteristic of at least one of the network, the client computer, or the server computer.

3. The method of claim 1, wherein the rule is based on a characteristic of browser software executing at the client computer.

4. The method of claim 1, wherein the rule is based on user data corresponding to a user of the client computer.

5. The method of claim 1, wherein
   the instruction comprises a first instruction;
   the rule comprises a first rule; and
   the first rule references at least one of a second instruction to provide a second portion of the generated webpage via the network or a second rule corresponding to the second instruction, the first and second portions in aggregate being less than the entirety of the generated webpage.

6. The method of claim 1 further comprising:
   receiving a request to refresh the first portion of the generated webpage, wherein
   the processing of the instruction is responsive to the request.

7. The method of claim 1, wherein the instruction provides the refreshed portion as a continuous stream of data based on a characteristic of the portion being refreshed.

8. A method of providing an update of a generated document, the method comprising:
   from a local computer, communicating the generated document via a network to a remote computer;
   at the local computer, accessing a data file that describes the generated document, the data file storing an instruction to provide constituent data incorporable into the generated document, the instructions provide the constituent data irrespective of input provided by a user;
   at the local computer, processing the instruction stored in the accessed data file to provide the constituent data incorporable into the generated document using a processor of the local computer; and
   from the local computer, providing the constituent data incorporable into the generated document via the network to the remote computer as the update of the generated document, in accordance with the instruction stored in the accessed data file and processed by the local computer.

9. The method of claim 8, wherein
   the instruction comprises a first instruction;
   the constituent data comprises first constituent data;
   the rule comprises a first rule; and
   the first rule references at least one of a second instruction to communicate second constituent data via the network or a second rule corresponding to the second instruction.

10. The method of claim 8 further comprising:
    receiving a request to update the generated document, and
    the processing of the instruction is responsive to the request.

11. The method of claim 8 further comprising:
    regenerating the generated document based on the data file; wherein
    the regenerated document includes the constituent data; and
    the providing of the constituent data includes communicating the regenerated document via the network to the remote computer.

12. The method of claim 8, wherein the instruction provides the constituent data as a continuous stream of data based on a characteristic of the constituent data.

13. A system to provide an update of a generated document, the system comprising:
    one or more processors;
    a non-transitory machine-readable storage medium comprising a set of instructions that, when executed by the one or more processors, cause the one or more processors to perform operations comprising:
       communicating the generated document via a network to a remote computer;
       accessing a data file that describes the generated document, the data file storing an instruction to provide constituent data incorporable into the generated document and including a rule corresponding to the instruction, the instruction provides the constituent data irrespective of input provided by a user;
       providing the constituent data incorporable into the generated document via the network to the remote computer as the update of the generated document, in accordance with the instruction stored in the accessed data file and processed by the system, wherein processing of the instruction is in accordance with the rule and wherein the rule is satisfied prior to processing of the instruction; and
       processing the instruction stored in the accessed data file to provide the constituent data incorporable into the generated document.

14. The system of claim 13, wherein
the rule is based on a characteristic of at least one of the network, the remote computer, the system, browser software executing on the remote computer, or a user of the remote computer.

15. The system of claim 13, wherein
the instruction comprises a first instruction;
the constituent data comprises first constituent data;
the rule comprises a first rule; and
the first rule references at least one of a second instruction to communicate second constituent data via the network or a second rule corresponding to the second instruction.

16. The system of claim 13, wherein the instructions cause the machine to perform operations comprising:
receiving a request to update the generated document, and processing the instruction responsive to the request.

17. The system of claim 13, wherein the instructions cause the machine to perform operations comprising:
regenerating the generated document based on the data file, the regenerated document includes the constituent data; and
in providing the constituent data to the remote computer, communicating the regenerated document via the network to the remote computer.

18. The system of claim 13, wherein the instruction provides the constituent data as a continuous stream of data based on a characteristic of the constituent data.

19. A non-transitory machine-readable storage medium comprising a set of instructions that, when executed by one or more processors of a machine, cause the machine to perform operations comprising:
from the machine, communicating the generated webpage via a network;
at the machine, accessing a data file that describes a generated webpage as including a plurality of portions, each portion of the plurality of portions being independently refreshable, the data file storing an instruction to provide a refreshed portion of the generated webpage via the network and including a rule corresponding to the instruction, the instruction providing the refreshed portion of the generated webpage irrespective of input provided by a user;
at the machine, processing the instruction stored in the accessed data file to provide the refreshed portion using the one or more processors of the machine, wherein the processing of the instruction is in accordance with the rule and wherein the rule is satisfied prior to processing of the instruction;
at the machine, updating a first portion of the generated webpage, the first portion being less than an entirety of the generated webpage; and
from the machine, providing the updated first portion of the generated webpage as the refreshed portion of the generated webpage via a network to a client computer, in accordance with the instruction stored in the accessed data file and processed by the machine.

20. The non-transitory machine-readable storage medium of claim 19, wherein the instruction provides the refreshed portion as a continuous stream of data based on a characteristic of the portion being refreshed.

21. A system to provide an update of a generated document, the system comprising:
means for:
from the system, communicating the generated document via a network to a remote computer;
at the system, accessing a data file that describes the generated document, the data file storing an instruction to provide constituent data incorporable into the generated document, the instruction provides the constituent data irrespective of input provided by a user; and
at the system, providing the constituent data incorporable into the generated document via the network to the remote computer as the update of the generated document, in accordance with the instructions stored in the accessed data file and processed by the system; and
means for, at the system, processing the instruction stored in the accessed data file to provide the constituent data incorporable into the generated document.

* * * * *